United States Patent
Lee et al.

(10) Patent No.: US 7,766,792 B2
(45) Date of Patent: Aug. 3, 2010

(54) POWER TRAIN STRUCTURE FOR HYBRID VEHICLES

(75) Inventors: Hee-Ra Lee, Gyeonggi-do (KR);
Yeon-Ho Kim, Gyeonggi-do (KR);
Tal-Chol Kim, Incheon (KR);
Kyung-Ha Kim, Gyeonggi-do (KR);
Wan-Soo Kim, Gyeonggi-do (KR);
Gwang-Seob Shin, Gyeonggi-do (KR);
Joo-Woong Yoon, Seoul (KR);
Seong-Jae Song, Seoul (KR);
Kyung-Won Hwang, Gyeonggi-do (KR); Jong-Hyun Kim, Gyeonggi-do (KR); In-Pil Yoo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 386 days.

(21) Appl. No.: 11/657,888

(22) Filed: Jan. 24, 2007

(65) Prior Publication Data
US 2008/0081730 A1    Apr. 3, 2008

(30) Foreign Application Priority Data
Sep. 28, 2006    (KR) ...................... 10-2006-0094670

(51) Int. Cl.
*F16H 61/58* (2006.01)
(52) U.S. Cl. .......................................... 477/62; 192/3.3
(58) Field of Classification Search .................. 477/5, 477/6, 62, 67, 167, 168; 192/3.3, 3.29; 60/358, 60/330; 903/948, 940; 180/65.2
See application file for complete search history.

(56) References Cited

U.S. PATENT DOCUMENTS

| | | | | |
|---|---|---|---|---|
| 5,086,889 | A | * | 2/1992 | Nobumoto et al. ............ 477/62 |
| 5,222,418 | A | * | 6/1993 | Murota ....................... 475/159 |
| 5,415,603 | A | * | 5/1995 | Tuzuki et al. .................. 477/5 |
| 5,755,638 | A | * | 5/1998 | Suzuki ........................ 477/62 |
| 6,482,127 | B2 | * | 11/2002 | Katou ........................ 477/192 |
| 6,647,326 | B2 | * | 11/2003 | Nakamori et al. ............ 701/22 |
| 6,758,293 | B2 | * | 7/2004 | Kayukawa et al. ......... 180/65.2 |
| 7,244,208 | B2 | * | 7/2007 | Bauknecht et al. ............. 475/5 |
| 7,314,425 | B2 | * | 1/2008 | Ito et al. ........................ 477/5 |
| 7,357,213 | B2 | * | 4/2008 | Ji ............................... 180/305 |
| 2006/0190145 | A1 | * | 8/2006 | Yamamoto et al. ............ 701/22 |
| 2007/0065296 | A1 | * | 3/2007 | Sakata et al. .................. 417/53 |
| 2008/0000746 | A1 | * | 1/2008 | Schiele et al. .............. 192/3.54 |

FOREIGN PATENT DOCUMENTS

| | | |
|---|---|---|
| JP | 2000-166023 | 6/2000 |
| JP | 2002-186227 | 6/2002 |
| JP | 2004-255973 | 9/2004 |
| JP | 2005-006395 | 1/2005 |

* cited by examiner

*Primary Examiner*—Roger L Pang
*Assistant Examiner*—Justin Holmes
(74) *Attorney, Agent, or Firm*—Edwards Angell Palmer & Dodge LLP; Peter F. Corless

(57) ABSTRACT

Disclosed are a power train structure that can operate hybrid vehicles in an electric mode at its startup and/or lower speed stages and a method of operation of the same.

16 Claims, 2 Drawing Sheets

POWER TRAIN STRUCTURE FOR HYBRID VEHICLES

CROSS-REFERENCE TO RELATED APPLICATIONS

The present application claims priority of Korean Patent Application Serial Number 10-2006-0094670 filed on Sep. 28, 2006 with the Korean Intellectual Property Office, the disclosure of which is hereby incorporated by reference herein in its entirety.

FIELD OF THE INVENTION

The present invention relates to power train structures for hybrid vehicles and, more particularly, to power train structures that can operate the vehicles in an electric mode at its startup and/or lower speed stages.

BACKGROUND OF THE INVENTION

Hybrid vehicles include both a gasoline engine and an electric motor. One big benefit of the hybrid vehicles is that the gasoline engine and electric motor are each used for what they do best. Particularly, the gas engine allows for long range on a high-density power source (gasoline), while the electric motor allows efficient capturing and reusing of "excess" energy. Another benefit is that hybrid vehicles offer low emissions and high fuel economy.

Generally, in consideration of complexity of installation process and costs for research and development, soft type hybrid power trains, which have typical a structure of conventional automatic transmissions except for an additional motor to supplement the power of the engine, are advantageous compared to hard type hybrid power trains.

However, in such conventional soft type hybrid power trains, the engine and the motor are operated always in conjunction with each other. As a result, hybrid vehicles equipped with such hybrid power trains are difficult to be started purely in an electric vehicle mode in which only a motor is operated while an engine is stopped.

There is thus a need for an improved power train structure that can operate a hybrid vehicle solely in an electric mode at an initial startup stage and in a low speed range, thereby offering lower emission and higher fuel economy.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention provides power train structures for hybrid vehicles that can be started only by the motor without using the engine and methods of operation of the same.

In one aspect, the present invention provides a power train structure for a hybrid vehicle equipped with an automatic transmission having a torque converter and a speed change device, comprising: (a) a motor provided between the torque converter and the speed change device and having a rotor coupled to a turbine of the torque converter; (b) an external oil pump operated by a separate electric motor; and (c) an internal oil pump provided in the speed change device, wherein the external oil pump and the internal oil pump are operatively configured so that the vehicle can be started by the motor while the engine is stopped.

A preferred power train structure of the present invention may further comprise a valve body for controlling the torque converter and the speed change device using hydraulic pressure.

Such power train structure may further comprise valve means for supplying hydraulic pressure from the external pump independently to the valve body and the torque converter.

Preferably, valve means may comprise a first hydraulic valve connected to the valve body through a first passage, and a second hydraulic valve connected to the torque converter through a second passage.

In another aspect, the present invention provides a power train structure for a hybrid vehicle equipped with an automatic transmission having a torque converter and a speed change device, comprising: (a) a motor provided between the torque converter and the speed change device and having a rotor coupled to a turbine of the torque converter; (b) an external oil pump operated by a separate electric motor; (c) an internal oil pump provided in the speed change device, wherein the external oil pump and the internal oil pump are operatively configured so that the vehicle can be started by the motor while the engine is stopped; and (d) a ring-shaped sealing bearing provided on a circumferential inner surface of the torque converter to isolate a space defined between the turbine and a lockup clutch of the torque converter from a space defined between the turbine and an impeller of the torque converter.

Such a power train structure may further comprise a valve body for controlling the torque converter and the speed change device using hydraulic pressure.

Preferably, it also may comprise valve means for supplying hydraulic pressure from the external pump independently to the valve body and the space between the turbine and the impeller of the torque converter.

A preferred example of such valve means comprises a first hydraulic valve connected to the valve body through a first passage, and a third hydraulic valve connected to the space between the turbine and the impeller of the torque converter through a third passage.

In still another aspect, the present invention provides a method of operating a power train structure comprising: a motor provided between a torque converter and a speed change device; an external oil pump; an internal oil pump; a valve body; a first hydraulic valve connected to the valve body; and a second hydraulic valve connected to the torque converter, the method comprising the steps of: (a) starting the vehicle in a state where oil is charged in the torque converter up to the level of a central shaft of the torque converter or lower; (b) generating hydraulic pressure in the external oil pump and supplying the pressure to the valve body through the first hydraulic valve; and (c) when the rpm of the engine and the rpm of the motor are synchronized, generating hydraulic pressure in the external oil pump and supplying the pressure to the torque converter through the second hydraulic valve.

In yet another aspect, the present invention provides a method of operating a power train structure comprising: a motor provided between the torque converter and the speed change device and having a rotor coupled to a turbine of the torque converter; an external oil pump; an internal oil pump; a ring-shaped sealing bearing provided on a circumferential inner surface of the torque converter to isolate a space defined between the turbine and a lockup clutch of the torque converter from a space defined between the turbine and an impeller of the torque converter; a valve body; a first hydraulic valve connected to the valve body; and a third hydraulic valve connected to the space between the turbine and the impeller of the torque converter, the method comprising the steps of: (a) starting the vehicle in a state where oil is charged in the space between the turbine and the lockup clutch up to a level lower than that where the lockup clutch is engaged, while no oil is charged between the turbine and the impeller; (b) controlling the valve body to increase hydraulic pressure between the turbine and the lockup clutch to engage the lockup cultch; and (c) supplying oil from the external pump to the space between the turbine and the impeller of the torque converter through the third hydraulic valve.

In a preferred method of the present invention, a separate integrated starter and generator (ISG) can be optionally used to start the engine. For example, it can be used to start the engine when a vehicle that has been moved in an electric mode can be moved in an engine mode or in a hybrid mode.

Suitably, in order to prevent energy loss, external pump can be stopped when the engine is started and the internal oil pump is operated so as to create sufficient hydraulic pressure.

In a further aspect, motor vehicles are provided that comprise a described power train structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present power train structures will be particularly useful with a wide variety of motor vehicles.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
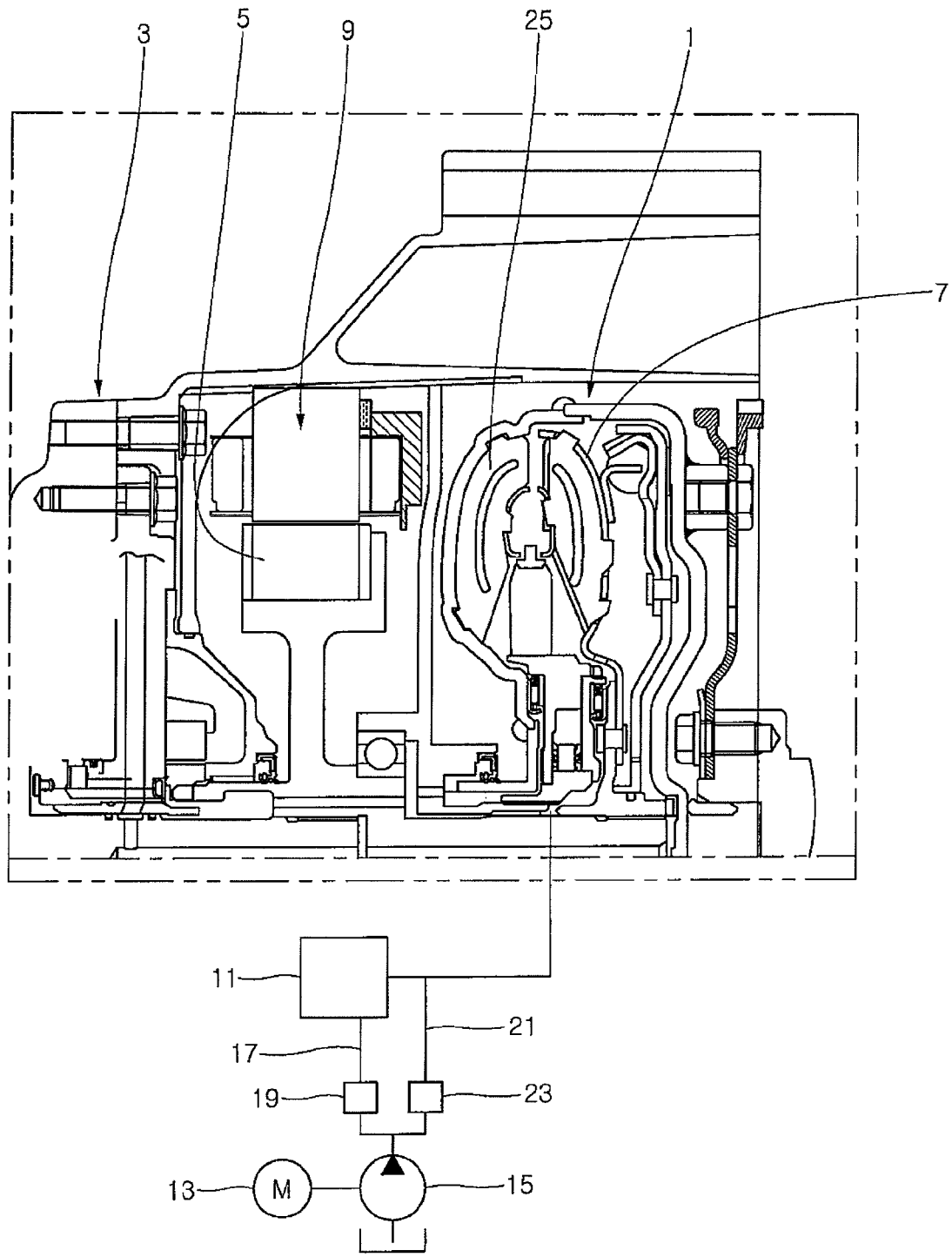
FIG. 1 is a view illustrating a power train structure for hybrid vehicles, according to a first preferred embodiment of the present invention.

Hereinafter, reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

As discussed above, in one aspect, the present invention provides a power train structure. FIG. 1 shows a preferred embodiment of the present invention. The power train structure includes a motor 9 provided between a torque converter 1 and a speed change device 3 of an automatic transmission and has a rotor 5 coupled to a turbine 7 of the torque converter. The power train structure further includes a valve body 11 to control the torque converter 1 and the speed change device 3 using hydraulic pressure. It also includes an external pump 15 operated by an electric motor 13. It also includes a valve means to supply hydraulic pressure from the external pump 15 independently to the valve body 11 and the torque converter 1.

The motor 9 is additionally provided in a typical automatic transmission equipped with the torque converter 1 and the speed change device 3. The motor 9 is positioned between the torque converter 1 and the speed change device 3, and the rotor 5 of the motor 9 is directly coupled to the turbine 7 of the torque converter 1.

The valve body 11 controls the torque converter 1 and the speed change device 3 using hydraulic pressure in the same manner as in conventional automatic transmissions.

An internal oil pump, which supplies hydraulic pressure to the valve body 11 and the torque converter 1, is provided in the speed change device 3.

In addition to the internal oil pump, the external pump 15 is provided. Furthermore, separate passages and a valve means are provided such that hydraulic pressure can be independently supplied from the external pump 15 to the valve body 11 and the torque converter 1 through the separate passages.

The valve means includes a first hydraulic valve 19 and a second hydraulic valve 23. The first hydraulic valve 19 controls the communication of a first passage 17 which extends from the external pump 15 to the valve body 11. The second hydraulic valve 23 controls the communication of a second passage 21 which extends from the external pump 15 to the torque converter 1.

The valve body 11 may be connected to the torque converter 1 through a passage. In FIG. 1, the valve body 11 is illustrated as being connected to the second passage 21.

In another aspect, as discussed above, the present invention provides methods of operating power train structures. The operation of the power train structure described above will be described herein below.

At an initial startup stage, oil is charged in the torque converter 2 only to the level of a central shaft of the torque converter 1 or lower.

If the motor 9 is operated to start the vehicle, the rotating force of the rotor 5 needs to be supplied to the turbine 7. Because the torque converter 1 is not completely filled with oil, the rotating force of the turbine 7 cannot be transmitted to an impeller 25 coupled to the engine, causing the turbine 7 to rotate for nothing.

As a result, the rotating force generated in the motor 9 is transmitted to a drive wheel through the speed change device 3 without being transmitted to the engine. Thus, while the engine is stopped, the vehicle can be started only by the motor 9, and, in addition, an electric vehicle mode can be conducted in a low speed range.

Here, the internal oil pump is operated at a relatively low speed, so that it may be difficult to create hydraulic pressure sufficient to control the speed change device 3 using the valve body 11. To overcome the above difficulty, the external pump 15 is operated and the first hydraulic valve 19 is opened, such that hydraulic pressure generated in the external pump 15 can be supplied to the valve body 11.

If desired, the engine can be started by a separate ISG. For example, a separate ISG can be used to start the engine when a vehicle, which has been moved in an electric mode, is desired to move in an engine mode or in a hybrid mode. Thereafter, the rpm of the engine and the rpm of the motor 9 are synchronized, and oil is supplied from the external pump 15 to the torque converter 1 through the second hydraulic valve 23.

Then, the torque converter 1 is filled with oil supplied from the external pump 15, thus performing the same function as that of a typical torque converter.

After oil is charged in the torque converter 1 to the typical level of the conventional art, the second hydraulic valve 23 is closed such that the torque converter I can be controlled by hydraulic control of the valve body 11.

As such, after the engine has been started and the internal oil pump has been thus operated in a state in which it can create sufficient hydraulic pressure, the external pump 15 is stopped to prevent energy loss.

Figure 2:
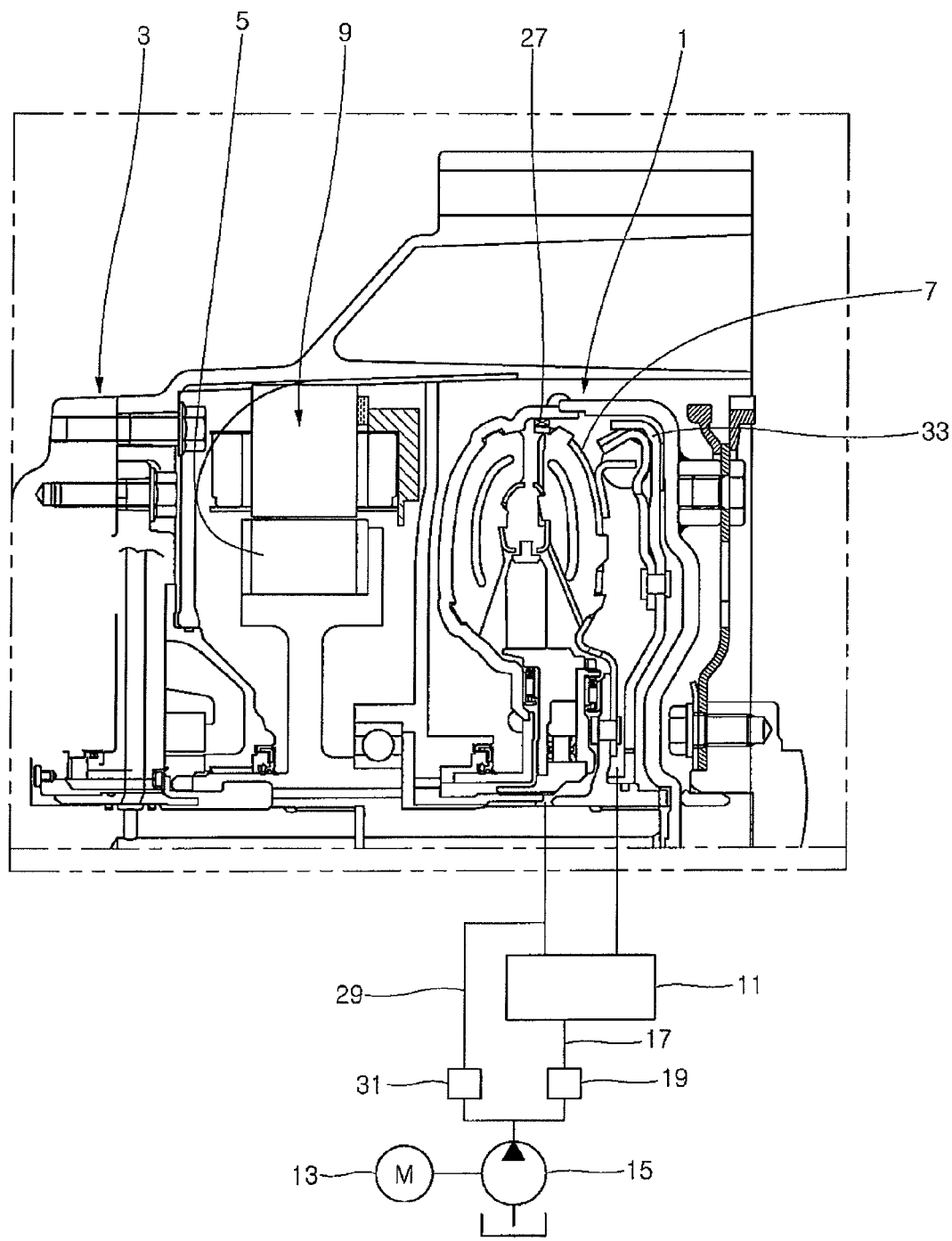
FIG. 2 is a view illustrating a power train structure for hybrid vehicles, according to a second preferred embodiment of the present invention.

FIG. 2 illustrates another preferred power train structure according to the present invention. The power train structure comprises a motor 9 provided between a torque converter 1 and a speed change device 3, and a rotor 5 coupled to a turbine 7 of the torque converter. It further comprises a ring-shaped sealing bearing 27 provided on a circumferential inner surface of the torque converter 1 to isolate a space defined between the turbine 7 and a lockup clutch 33 in the torque converter 1 from a space defined between an impeller 25 and the turbine 7. It also comprises a valve body 11 to control the torque converter 1 and the speed change device 3 using hydraulic pressure. Also, it comprises an external pump 15 operated by an electric motor 13. In addition, it comprises a valve means for supplying hydraulic pressure from the external pump 15 independently to the valve body 11 and the space between the turbine 7 and the impeller 25 of the torque converter 1.

In this embodiment, the valve means comprises a first hydraulic valve 19 and a third hydraulic valve 31. The first hydraulic valve 19 controls the communication of a first passage 17 that extends from the external pump 15 to the valve body 11. The third hydraulic valve 31 controls the communication of a third passage 29 that extends from the external pump 15 to the space between the turbine 7 and the impeller 25 of the torque converter 1.

In other words, in this embodiment, the space defined between the turbine 7 and the lockup clutch 33 in the torque converter 1 and the space defined between the turbine 7 and the impeller 25 are isolated from each other by the sealing bearing 27. The vehicle is started in a state in which oil is charged in the space between the turbine 7 and the lockup clutch 33 to a level just below that at which the lockup clutch 33 is engaged, while no oil is charged in the space between the turbine 7 and the impeller 25.

Therefore, when the vehicle is in a low speed range after having started, only the turbine 7 is rotated by power generated in the motor 9, and the impeller 25 and the casing of the torque converter I are not rotated. Thus, only the rotating force of the motor 9 is transmitted to a drive wheel through the speed change device 3 while the engine is stopped.

In this embodiment, a separate ISG can optionally be used to start the engine. For example, it can be used when a vehicle, which has been moved in an electric mode, needs to be moved in an engine mode or a hybrid mode. Thereafter, the valve body 11 increases hydraulic pressure between the turbine 7 and the lockup clutch 33 to engage the lockup clutch 33, and oil is supplied from the external pump 15 to the space between the turbine 7 and the impeller 25 of the torque converter 1 through the third hydraulic valve 31.

Then, power is transmitted between the impeller 25 and the turbine 7 in the same manner as that of typical torque converters, so that the torque converter 1 functions as typical torque converters do. Therefore, the power of the engine is transmitted to the drive wheel through the speed change device 3.

This second embodiment is generally the same as that of the first embodiment except for the above-mentioned structure and operation mode, further explanation is deemed unnecessary.

As is apparent from the foregoing, a power train structure for a hybrid vehicle according to the present invention additionally comprises a motor to a typical automatic transmission to provide the vehicle that can be started only by the motor, without using the engine. Therefore, the vehicle can be operated in an electric mode at an initial startup stage and in a low speed range, thus reducing fuel consumption and the amount of discharge gas.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A power train structure for a hybrid vehicle equipped with an automatic transmission having a torque converter and a speed change device, comprising:
    a motor provided between the torque converter and the speed change device and having a rotor coupled to a turbine of the torque converter;
    an external oil pump operated by a separate electric motor;
    an internal oil pump provided in the speed change device, wherein the external oil pump and the internal oil pump are operatively configured so that the vehicle can be started by the motor while the engine is stopped;
    a valve body for controlling the torque converter and the speed change device using hydraulic pressure; and
    valve means for supplying hydraulic pressure from the external pump independently to the valve body and the torque converter, wherein the valve means comprises: a first hydraulic valve connected to the valve body through a first passage; and a second hydraulic valve connected to the torque converter through a second passage.

2. The power train structure of claim 1, further comprising a ring-shaped sealing bearing provided on a circumferential inner surface of the torque converter to isolate a space defined between the turbine and a lockup clutch of the torque converter from a space defined between the turbine and an impeller of the torque converter.

3. The power train structure of claim 2, further comprising a valve body for controlling the torque converter and the speed change device using hydraulic pressure.

4. The power train structure of claim 3, further comprising valve means for supplying hydraulic pressure from the external pump independently to the valve body and the space between the turbine and the impeller of the torque converter.

5. The power train structure of claim 4, wherein the valve means comprises:
    a first hydraulic valve connected to the valve body through a first passage; and
    a third hydraulic valve connected to the space between the turbine and the impeller of the torque converter through a third passage.

6. A method of operating a power train structure comprising: a motor provided between a torque converter and a speed change device; an external oil pump; an internal oil pump; a valve body; a first hydraulic valve connected to the valve body; and a second hydraulic valve connected to the torque converter, the method comprising the steps of:
    starting the vehicle in a state where oil is charged in the torque converter up to the level of a central shaft of the torque converter or lower;
    generating hydraulic pressure in the external oil pump and supplying the pressure to the valve body through the first hydraulic valve; and when the rpm of the engine and the rpm of the motor are synchronized, generating hydraulic pressure in the external oil pump and supplying the pressure to the torque converter through the second hydraulic valve.

7. The method of claim 6, wherein a separate integrated starter and generator (ISG) is used to start the engine.

8. The method of claim 6, further comprising the step of stopping operation of the external pump when the engine is started and the internal oil pump is operated so as to create sufficient hydraulic pressure.

9. A method of operating a power train structure comprising: a motor provided between the torque converter and the speed change device and having a rotor coupled to a turbine of the torque converter; an external oil pump; an internal oil pump; a ring-shaped sealing bearing provided on a circumferential inner surface of the torque converter to isolate a space defined between the turbine and a lockup clutch of the torque converter from a space defined between the turbine and an impeller of the torque converter; a valve body; a first hydraulic valve connected to the valve body; and a third hydraulic valve connected to the space between the turbine and the impeller of the torque converter, the method comprising the steps of:
- starting the vehicle in a state where oil is charged in the space between the turbine and the lockup clutch up to a level lower than that where the lockup clutch is engaged, while no oil is charged between the turbine and the impeller;
- controlling the valve body to increase hydraulic pressure between the turbine and the lockup clutch to engage the lockup cultch; and
- supplying oil from the external pump to the space between the turbine and the impeller of the torque converter through the third hydraulic valve.

10. The method of claim 9, wherein a separate integrated starter and generator (ISG) is used to start the engine.

11. The method of claim 9, further comprising the step of stopping operation of the external pump when the engine is started and the internal oil pump is operated so as to create sufficient hydraulic pressure.

12. A vehicle comprising the power train structure of claim 1.

13. A vehicle comprising the power train structure of claim 2.

14. A power train structure for a hybrid vehicle equipped with an automatic transmission having a torque converter and a speed change device, comprising:
- a motor provided between the torque converter and the speed change device and having a rotor coupled to a turbine of the torque converter;
- an external oil pump operated by a separate electric motor;
- an internal oil pump provided in the speed change device, wherein the external oil pump and the internal oil pump are operatively configured so that the vehicle can be started by the motor while the engine is stopped;
- a ring-shaped sealing bearing provided on a circumferential inner surface of the torque converter to isolate a space defined between the turbine and a lockup clutch of the torque converter from a space defined between the turbine and an impeller of the torque converter.

15. The power train structure of claim 14, further comprising a valve body for controlling the torque converter and the speed change device using hydraulic pressure.

16. A vehicle comprising the power train structure of claim 14.

* * * * *